United States Patent [19]
Thompson

[11] 3,869,668
[45] Mar. 4, 1975

[54] UNDERWATER ELECTRICAL POWER LEAKAGE CURRENT DETECTOR

[75] Inventor: John R. Thompson, Camarillo, Calif.

[73] Assignee: The United States of America as represented by the Secretary of the Navy, Washington, D.C.

[22] Filed: Oct. 25, 1973

[21] Appl. No.: 410,010

[52] U.S. Cl................ 324/133, 317/18 D, 324/54, 324/72
[51] Int. Cl..................... G01r 19/16, G01r 31/02
[58] Field of Search ........ 324/51, 72, 54, 72.5, 133; 317/18 D; 340/255

[56] References Cited
UNITED STATES PATENTS

| | | | |
|---|---|---|---|
| 2,422,644 | 6/1947 | Martenet | 324/54 |
| 2,585,734 | 2/1952 | Bucher | 317/18 D X |
| 2,700,125 | 1/1955 | King et al. | 317/18 D |
| 2,993,172 | 7/1961 | Karlicek | 324/133 |
| 3,320,524 | 6/1967 | Miller | 324/54 |
| 3,510,766 | 5/1970 | Russell et al. | 324/72.5 |
| 3,526,831 | 9/1970 | Smith | 324/54 |

*Primary Examiner*—Gerard R. Strecker
*Attorney, Agent, or Firm*—Richard S. Sciascia; Joseph M. St. Amand; Darrell E. Hollis

[57] ABSTRACT

An underwater electrical power-leakage detector comprising a metallic probe for sensing electrical currents. A resistor converts the current from the probe into a voltage which drives a positive and a negative voltage detector. The output of the positive and negative detectors drives a power trip relay or an indicator device. The electrical power-leakage detector is housed in a water-tight case.

6 Claims, 2 Drawing Figures

UNDERWATER ELECTRICAL POWER LEAKAGE CURRENT DETECTOR

BACKGROUND OF THE INVENTION

1. Field of the Invention

The present invention relates, generally, to electrical power detectors and, more particularly, to underwater electrical-power leakage detection.

As is well known, an electrical current of as little as 25 milliamps can be fatal to a human in a very short time. As the current increases, the duration of the exposure required to effect fatal cardiac fibrillation decreases. For example, a current of 500 milliamps or one-half ampere can kill a human in approximately 0.1 second, and a current of 1,000 milliamps or 1 ampere can be fatal in as little as 0.02 seconds. Since current amplitude is a function of voltage divided by resistance and, since the resistance of a human body is only approximately 200 ohms when immersed in water (as opposed to approximately 100,000 ohms above water), it is appreciated that exposure of a human body to electrical current underwater is much more dangerous than above water.

2. Description of the Prior Art

Prior art devices typically utilize magnetic detectors and mechanical relays. Such devices are incapable of detecting small electrical currents in the water that are capable of electrically shocking a diver. In addition, such prior art devices, employed as circuit breakers for underwater power tools, do not respond fast enough to offer adequate protection to a diver. Also, such devices are typically complex and custom designed to monitor a particular underwater tool. Hence, such prior art devices have limited applicability.

SUMMARY OF THE INVENTION

The general purpose of the present invention is to provide an underwater electrical-power leakage detector that is capable of detecting any current that might cause electrical shock and that responds fast enough to prevent electrical shock to a diver. To attain this, one embodiment of the present invention provides a metallic probe for sensing underwater electrical currents emanating from an underwater power source and tool. The probe projects out of a water-tight case which houses the detecting equipment. The probe's output, located inside the case, is connected to the inputs of a positive voltage detector and a negative voltage detector. The probe's output is also connected to a resistive circuit which provides a voltage that is a function of the leakage current to drive the voltage detectors. The resistance circuit is also connected to the underwater power source being monitored so as to complete the circuit between the probe and the source of leakage current.

Accordingly, one object of the present invention is to detect small underwater electrical-power leakage currents.

Another object of the present invention is to provide faster detection of underwater electrical-power leakage currents.

Another object of the present invention is to provide underwater electrical-power leakage detection for many varying types of underwater power sources and tools.

Another object of the present invention is to provide electrical shock protection for divers.

Another object of the present invention is to provide an electrical-power leakage current detector that exhibits great sensitivity.

Other objects and a more complete appreciation of the present invention and its many attendant advantages will develop as the same becomes better understood by reference to the following detailed description when considered in connection with the accompanying drawings in which like reference numerals designate like parts throughout the figures thereof and wherein:

DESCRIPTION OF THE PREFERRED EMBODIMENT

Figure 1:
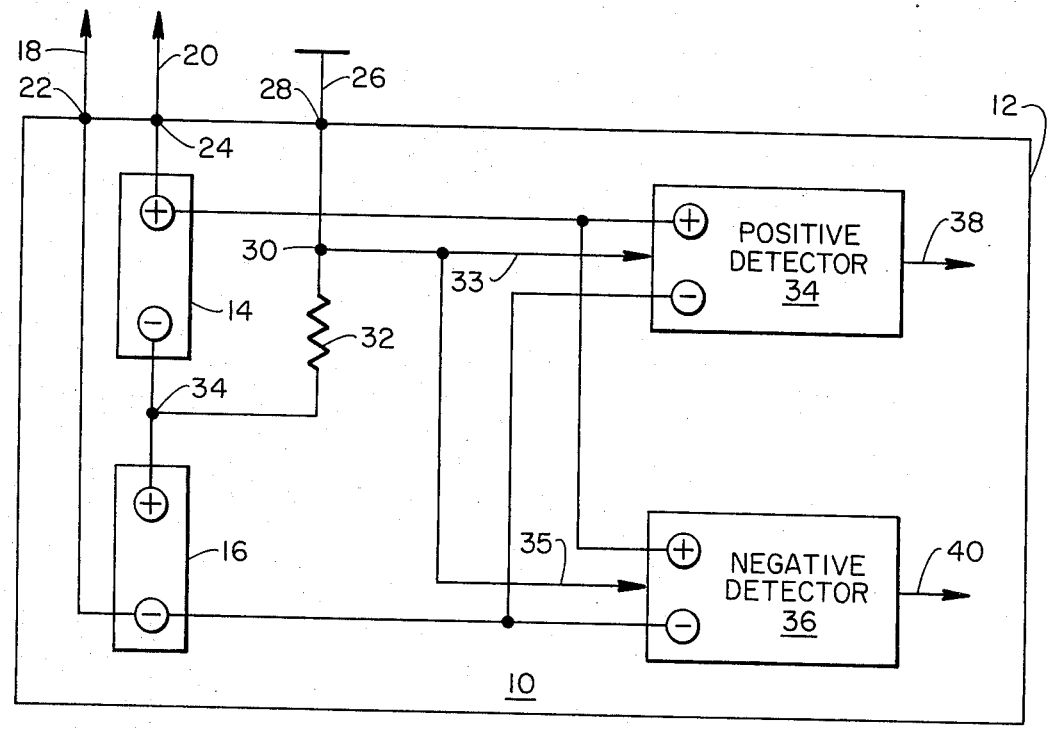
FIG. 1 is a diagram of one embodiment of the present invention.

Referring first to FIG. 1, electrical-power leakage-current detector 10 is enclosed in an oil-filled, water-tight, pressure-compensated case 12. Case 12 may be manufactured using any suitable material. However, if a material having the properties of an electrical conductor is utilized, all parts of the detector must be electrically insulated therefrom.

Batteries 14 and 16 provide a power supply to drive an underwater tool or other device (not shown). Insulated electrical lines 18 and 20 are the power lines communicating power from batteries 14 and 16 to the underwater tool (not shown). Water-tight seals 22 and 24 prevent water from entering case 12. It is noted that batteries 14 and 16 constitute a direct-current source. However, an alternating-current source could be utilized, as well. It is also noted that batteries 14 and 16 could be located outside case 12 provided other suitable housing is provided.

Metallic probe 26 extends through case 12 into the water. Water-tight seal 28 precludes the encroachment of water into case 12. Metallic probe 26 senses electrical power leakage currents from power lines 18 and 20. Metallic probe 26 has an output terminal 30 located inside case 12.

A resistor 32 is connected between metallic probe output 30 and power-source center-tap 34. This completes the circuit between probe 26 and power lines 18 and 20. Resistor 32 converts the leakage current sensed by metallic probes 26 into a voltage level.

Metallic probe output terminal 30 is also connected to the inputs of positive voltage detector 34 and negative voltage detector 36 via lines 33 and 35, respectively. Voltage detectors 34 and 36 are off-the-shelf packages produced by a large number of electronic manufacturers. One such detector capable of satisfactory operation in detector 10 is Magsense Model 32NL by Pioneer Standard Company of Cleveland, Ohio. Voltage detectors 34 and 36 output signals on lines 38 and 40, respectively. It is noted that in FIG. 1 batteries 14 and 16 provide D.C. bias voltage for voltage detectors 34 and 36. However, as is appreciated by those skilled in the art, such bias voltage could be provided by other means.

Now consider the case where the insulated line 20 is mechanically damaged and the metallic conductor exposed to the water environment. This failure now represents a potential hazard to divers who would be using the electrically powered device (not shown). As soon as the insulation on line 20 is compromised, an electrical current will flow from the conductor of line 20 through the water to probe 26, then through resistance 32 to center-tap 34. This current flow results in a voltage drop appearing across resistance 32. The voltage drop across resistance 32 is positive at point 30 with respect to center-tap 34. This positive voltage is detected by positive voltage detector 34. Positive voltage detector 34 then outputs a signal on line 38. The signal on line 38 may be utilized to trip a solid-state relay (not shown) which would disconnect batteries 14 and 16 from line 20 or activate visual or audible alarms (not shown), or initiate other action. The use of solid-state relays (not shown), which is available as off-the-shelf hardware, results in turning off the power in less than 100 microseconds from time of failure. This is amply adequate to protect the diver and the support personnel from any dangerous exposure to stray, electrical-power, leakage currents. Detector 10 will detect electrical-power, leakage currents of values as low as two-tenths of a microampere. If the insulation of line 18 is compromised, the detector 10 will function in the same manner except negative voltage detector 36 is activated.

Figure 2:
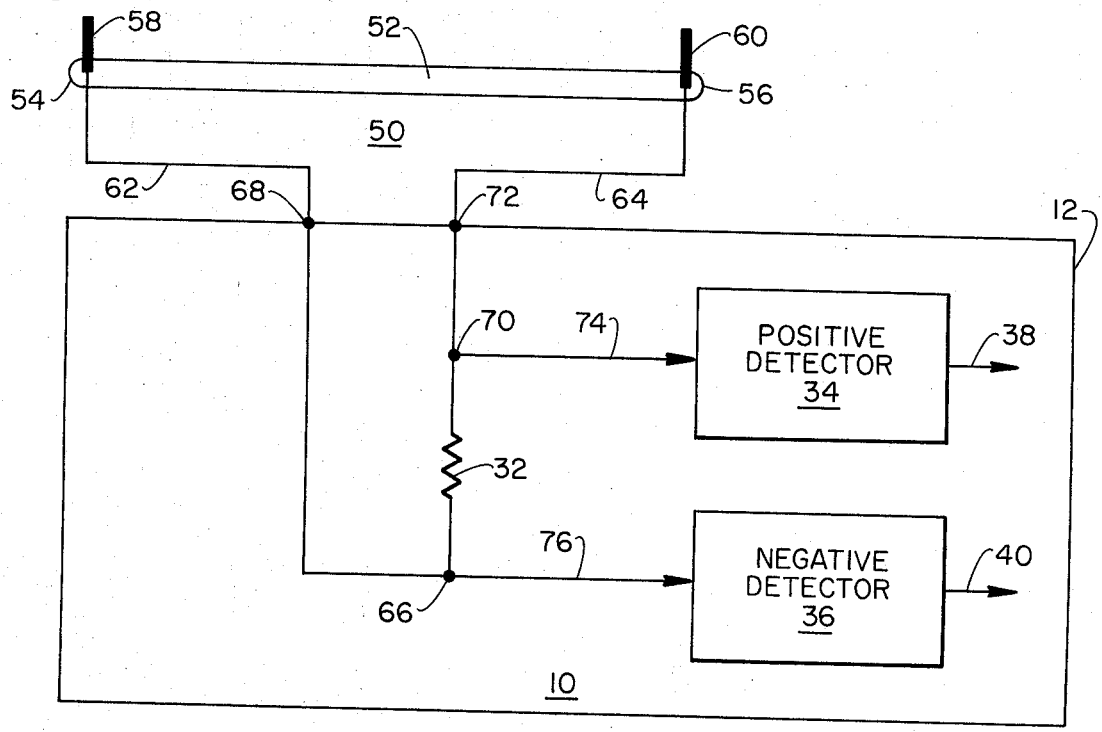
FIG. 2 is a diagram of a second embodiment of the present invention.

Now turning to FIG. 2, electrical-power, leakage-current detector 10 is enclosed in an oil-filled, water-tight, pressure compensated case 12. Again, case 12 may be manufactured using any suitable material. However, if a material having the properties of an electrical conductor is utilized, all parts of the detector must be electrically insulated therefrom. Electrical-power, leakage-current sensor 50 is comprised of an elongated, electrical-insulating rod 52. Rod 52 has a first end 54 and a second end 56. A first metallic rod 58 is partially embedded in insulating rod 52 at end 54. A second metallic rod 60 is partially embedded in insulating rod 52 and end 56. An insulated electrical wire 62 is connected between metallic rod 58 and sensor output terminal 66, located inside case 12. A water-tight seal 68 prevents water leakage at the point where wire 62 penetrates case 12. An insulated electrical wire 64 is connected between metallic rod 60 and sensor output terminal 70, located inside case 12. A water-tight seal 72 prevents water leakage at the point where wire 62 penetrates case 12.

Any electrical current in the water capable of creating a potential difference in voltage between metallic rod 58 and 60 creates a current in the circuit comprised of wires 62 and 64 and resistor 32. Resistor 32 is connected between sensor output terminals 66 and 70. Resistor 32 converts the electrical current into a voltage. This voltage inputs positive voltage detector 34 and negative voltage detector 36 via lines 74 and 76, respectively. When a positive or negative current is detected, positive voltage detector 34 or negative voltage detector 36 output a signal on lines 38 and 40, respectively. Positive voltage detector 34 and negative voltage detector 36 are identical to the voltage detectors of FIG. 1. The signal outputs on lines 38 and 40 may be utilized as discussed supra with respect to FIG. 1. It is noted that the detector 10 of FIG. 2 is particularly convenient for detecting electrical currents emanating from sunken vessels and other underwater sources.

It will be appreciated by those skilled in the art that the complete circuit diagram of FIG. 2 includes such suitable and necessary biasing voltage sources as are usually provided. Such biasing is not shown in FIG. 2.

Obviously, numerous modifications and variations of the present invention are possible in light of the above teachings. It is therefore to be understood that within the scope of the appended claims the invention may be practiced otherwise than as specifically described herein.

I claim:

1. An underwater diver protection device for detecting electrical-power leakage currents as small as two-tenths of a microampere from an underwater power source and tool comprising:
   a water-tight, oil-filled, pressure-compensated case;
   means for detecting positive voltages, located inside said case, having a sensor input and an output;
   means for detecting negative voltages, located inside said case, having a sensor input and an output;
   means for sensing electrical leakage currents as small as two-tenths of a microampere in an underwater environment, said means extending out through said case and forming a water-tight seal at all points of penetration of said case, said means also having an output terminal located inside said case, said output terminal being connected to the sensor input of said means for detecting positive voltages and to the sensor input of said means for detecting negative voltages;
   means connected between said output terminal of said means for sensing electrical currents and the power source for creating a voltage that is a function of the current sensed by said means for sensing electrical currents, thereby providing a voltage input to said means for detecting positive voltages and said means for detecting negative voltages whereby said means for detecting positive voltages and said means for detecting negative voltages output a trip signal when said leakage currents are sensed.

2. The underwater diver protection device of claim 1 wherein said means for sensing electrical currents comprises a metallic probe.

3. The underwater diver protection device of claim 1 wherein said means for creating a voltage comprises a resistive circuit.

4. An underwater electrical-power leakage detector for protecting divers from electrical shock comprising:
   a water-tight, oil-filled, pressure-compensated case;
   means for detecting positive voltages, located inside said case, having a sensor input and an output;
   means for detecting negative voltages, located inside said case, having a sensor input and an output;
   means for sensing electrical currents as small as two-tenths of a microampere in an underwater environment, said means extending through said case and having a first and second output terminal located inside said case, said means forming a water-tight seal at all points of penetration of said case, said first output terminal being connected to said sensor input of said means for detecting positive voltages, said second output terminal being connected to said sensor input of said means for detecting negative voltages; and
   means connected between said first output terminal and said second output terminal for creating a voltage that is a function of the current sensed by said means for sensing electrical currents, thereby providing a voltage input to said means for detecting positive voltages and said means for detecting negative voltages whereby said means for detecting positive voltages and said means for detecting negative voltages output an indicator signal when said leakage currents are sensed.

5. The underwater electrical power leakage detector for protecting divers from electrical shock of claim 4 wherein said means for sensing electrical currents comprises:

an elongated electrically insulating rod having a first and a second end;

a first metallic rod partially embedded in said first end of said elongated rod;

a second metallic rod partially embedded in said second end of said elongated rod;

means for transmitting electrical currents from said first metallic rod to said first output of said means for sensing electrical currents; and means for transmitting electrical currents from said second metallic rod to said second output of said means for sensing electrical currents.

6. The underwater electrical-power leakage detector for protecting divers from electrical shock of claim 4 wherein said means for creating a voltage comprises a resistive circuit.

* * * * *